United States Patent
Frazier et al.

(10) Patent No.: US 6,349,135 B2
(45) Date of Patent: Feb. 19, 2002

(54) METHOD AND SYSTEM FOR A WIRELESS DIGITAL MESSAGE SERVICE

(75) Inventors: Edward C. Frazier; Victor A. Weir, III, both of Arlington; Eugene D. Termini, Rockwall; Stephen W. Eckersley, Arlington, all of TX (US)

(73) Assignee: Frazier/King Media Holding Co., Irving, TX (US)

( * ) Notice: Subject to any disclaimer, the term of this patent is extended or adjusted under 35 U.S.C. 154(b) by 0 days.

(21) Appl. No.: 09/145,146

(22) Filed: Sep. 1, 1998

(51) Int. Cl.$^7$ ............................................... H04M 11/00
(52) U.S. Cl. .............................. 379/93.01; 379/100.01; 379/100.14
(58) Field of Search ........................... 379/93.01, 93.05, 379/93.24, 100.01, 100.14, 93.06, 93.08; 455/557; 358/400, 440

(56) References Cited

U.S. PATENT DOCUMENTS

| | | | |
|---|---|---|---|
| 4,207,598 A | 6/1980 | Reich et al. ................. 358/257 |
| 4,251,836 A | 2/1981 | Moreau ....................... 358/264 |
| 4,652,934 A | 3/1987 | Muroya et al. .............. 358/260 |
| 4,881,129 A | 11/1989 | Mitsuhashi .................. 358/434 |
| 4,933,770 A | 6/1990 | DeSpain ..................... 358/434 |
| 4,991,201 A | 2/1991 | Tseng ......................... 379/100 |
| 4,994,926 A | 2/1991 | Gordon et al. .............. 358/400 |
| 5,200,991 A | 4/1993 | Motoyanagi ................. 379/61 |
| 5,237,428 A * | 8/1993 | Tajitsu et al. ............... 358/440 |
| 5,237,429 A | 8/1993 | Zuiss et al. ................. 358/442 |
| 5,263,078 A | 11/1993 | Takahashi et al. ........... 379/58 |
| 5,282,238 A | 1/1994 | Berland ....................... 379/58 |
| 5,291,302 A | 3/1994 | Gordon et al. .............. 358/400 |
| 5,291,305 A | 3/1994 | Sakashita et al. ........... 358/444 |
| 5,325,212 A | 6/1994 | Endo et al. .................. 358/468 |
| 5,343,305 A * | 8/1994 | Shiraogawa et al. ........ 358/440 |
| 5,369,501 A | 11/1994 | Wilson et al. ............... 358/407 |
| 5,373,300 A * | 12/1994 | Jenness et al. .............. 455/575 |
| 5,404,231 A * | 4/1995 | Bloomfield ................. 358/400 |
| 5,422,733 A * | 6/1995 | Merchant et al. ........... 358/407 |
| 5,459,584 A | 10/1995 | Gordon et al. .............. 358/434 |
| 5,495,344 A | 2/1996 | Callaway, Jr. et al. ...... 358/407 |
| 5,524,048 A | 6/1996 | Ozawa ........................ 379/100 |

(List continued on next page.)

FOREIGN PATENT DOCUMENTS

JP  407177280 A  *  7/1995  ............ H04N/1/00

OTHER PUBLICATIONS

Shefi et al, Global Two way Paging using Internet, WO 98/12883, Mar. 26, 1998.*

Primary Examiner—Huyen Le
Assistant Examiner—Melur Ramakrishnaiah
(74) Attorney, Agent, or Firm—Daniel J. Chalker; Sanford E. Warren, Jr.; Gardere Wynne Sewell LLP

(57) ABSTRACT

The present invention provides a method and system for transmitting a digital message from a source to one or more receiving devices. After the digital message is received from the source, the one or more receiving devices are selected from a list of addressable receiving devices and the digital message is routed through a local area network until the digital message can be transmitted to the one or more receiving devices. The digital message is then transmitted to the one or more receiving devices using a single wireless transmission. Alternatively, the present invention provides a method and system for transmitting a digital message from a source to one or more destinations. After the digital message is received from the source, the digital message is transmitted over a wireless communications link to each of the one or more destinations, if any, that has a device for receiving the digital message over the wireless communications link. The digital message is also transmitted over a telephone network to each of the one or more destinations, if any, that has a device for receiving the digital message over the telephone network but not over the wireless communications link.

45 Claims, 4 Drawing Sheets

U.S. PATENT DOCUMENTS

| | | | |
|---|---|---|---|
| 5,537,458 A | | 7/1996 | Suomi et al. .................. 379/59 |
| 5,550,646 A | * | 8/1996 | Hassan et al. ............... 358/400 |
| 5,712,712 A | | 1/1998 | Sayward ..................... 358/403 |
| 5,726,764 A | | 3/1998 | Averbuch et al. ........... 358/403 |
| 5,752,199 A | | 5/1998 | Scott .......................... 455/557 |
| 5,764,375 A | | 6/1998 | Park ........................... 358/440 |
| 5,790,268 A | | 8/1998 | Chomet ...................... 358/442 |
| 5,805,810 A | * | 9/1998 | Maxwell ................ 395/200.36 |
| 5,889,852 A | * | 5/1999 | Rosecrans et al. ....... 379/93.23 |
| 6,067,561 A | * | 5/2000 | Dillion .................... 379/93.24 |

* cited by examiner

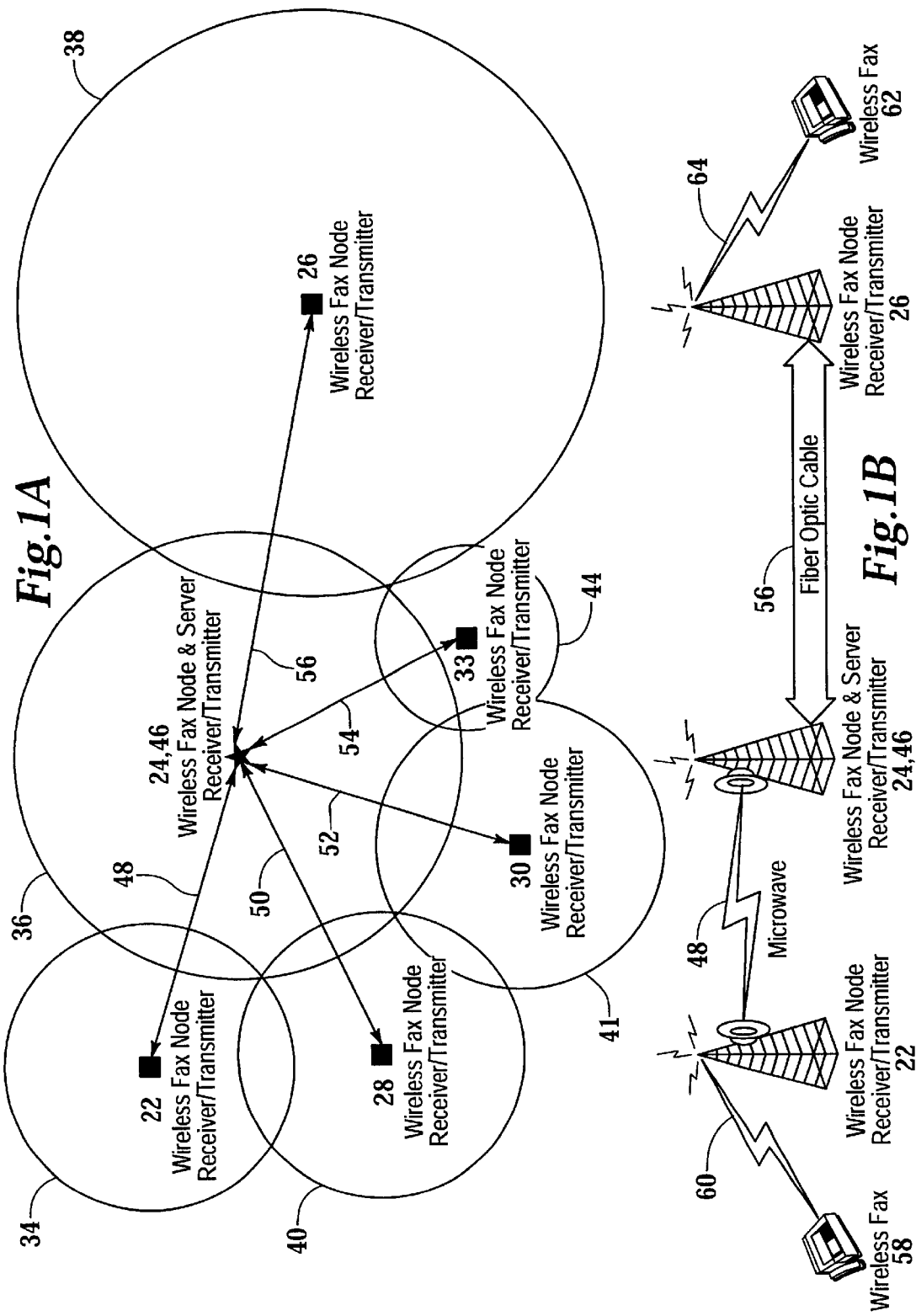

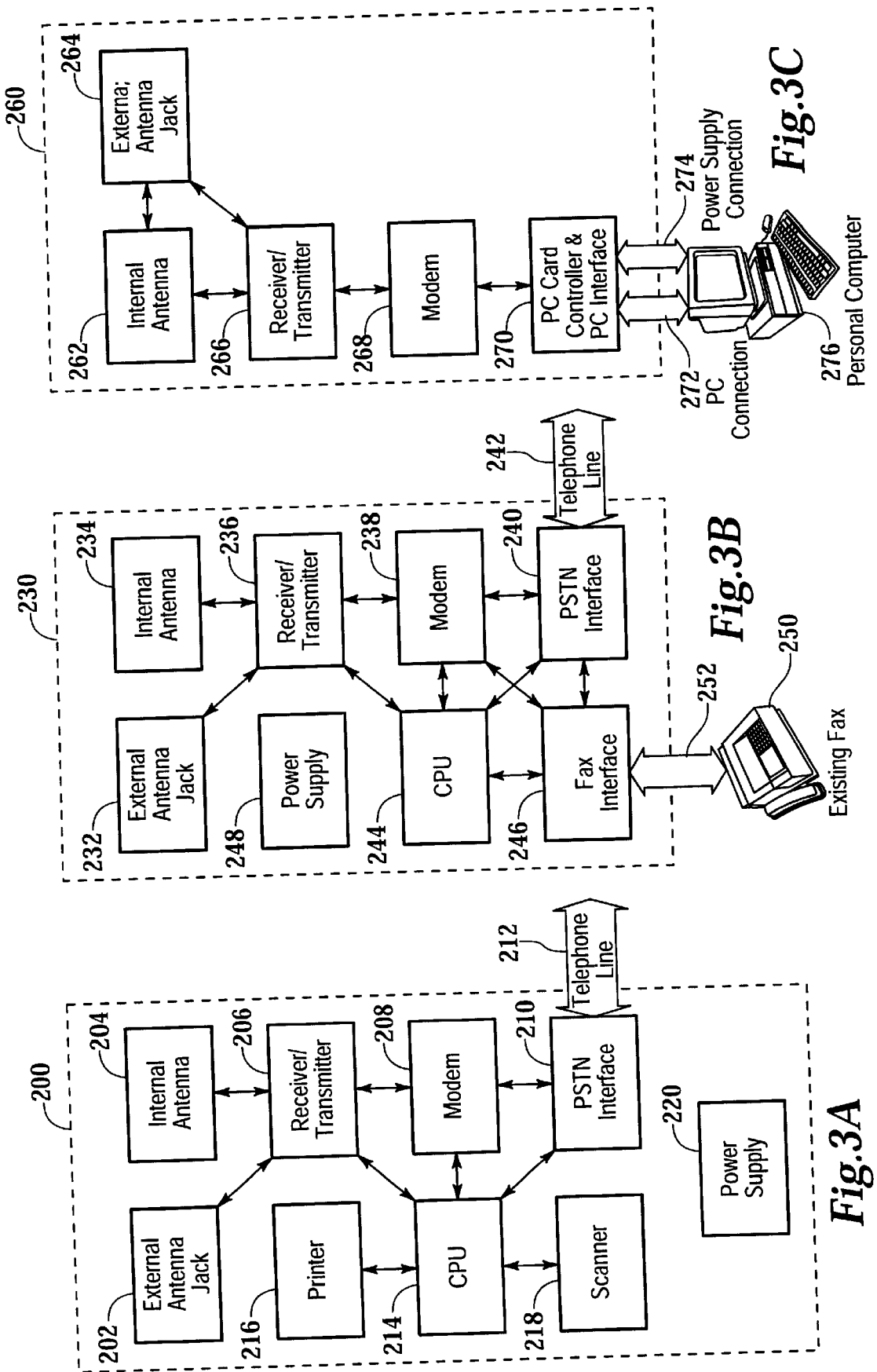

METHOD AND SYSTEM FOR A WIRELESS DIGITAL MESSAGE SERVICE

FIELD OF THE INVENTION

The present invention relates generally to wireless communication networks, and more particularly to a method and system for a wireless digital message service.

BACKGROUND OF THE INVENTION

Without limiting the scope of the present invention, this background of the present invention is described in connection with radio frequency facsimile communication networks. The present invention, however is not limited to providing facsimile services in a radio frequency communication network and is applicable to providing any type of digital message service in a wireless communication network.

Telephone based facsimile machines typically require multiple analog-to-digital and digital-to-analog conversions. These conversions reduce the accuracy and efficiency of facsimile transmissions. Moreover, telephone based facsimile machines are not capable of receiving or sending color facsimile messages.

Similarly, broadcast facsimile systems typically send telephone based facsimile messages to a list of known telephone numbers, each telephone number presumably providing a connection to a facsimile machine. Each telephone number is called until all the telephone numbers on a list have been dialed. If there are errors during transmission or a busy signal is received, the number is re-dialed later. Such a system is inefficient, time consuming and expensive. For example, sending a one page facsimile message that will take at least thirty (30) seconds to transmit, will take at least 50 minutes to send the facsimile message to one hundred (100) facsimile machines. Moreover, many individuals consider this type of system to be annoying.

In addition, most facsimile systems do not allow for mobile facsimile machines. And those systems that do typically utilize a pager-size data receiver that is plugged into a computer and printer when a fax is received, rather than a true facsimile machine. Furthermore, the process to receive and print out the facsimile message is complicated and tedious.

SUMMARY OF THE INVENTION

Other features and advantages of the present invention shall be apparent to those of ordinary skill in the art upon reference to the following detailed description taken in conjunction with the accompanying drawings.

The present invention provides a method for transmitting a digital message from a source to one or more receiving devices. After the digital message is received from the source, the one or more receiving devices are selected from a list of addressable receiving devices and the digital message is routed through a local area network until the digital message can be transmitted to the one or more receiving devices. Thereafter, the digital message is transmitted to the one or more receiving devices using a single wireless transmission.

Alternatively, the present invention provides a method for transmitting a digital message from a source to one or more receiving destinations. After the digital message is received from the source, the digital message is transmitted over a wireless communications link to each of the one or more destinations, if any, that has a device for receiving the digital message over the wireless communications link. The digital message is also transmitted over a telephone network to each of the one or more destinations, if any, that has a device for receiving the digital message over the telephone network but not over the wireless communications link.

The present invention also provides a method wherein after the digital message is received from the source, the digital message is routed through a wide area network, if necessary, until each of the one or more receiving destinations are accessible by a local area network. The digital message is then routed through the local area network until the digital message can be transmitted to each of the one or more destinations. Next, the digital message is transmitted over a wireless communications link to each of the one or more destinations, if any, that has a device for receiving the digital message over the wireless communications link. The digital message is also transmitted over a telephone network to each of the one or more destinations, if any, that has a device for receiving the digital message over the telephone network but not over the wireless communications link. In addition, a hard copy of the digital message is sent to one or more destinations, if any, that do not have a device for receiving the digital message over the wireless communications link or the telephone network.

In addition, the present invention provides a system that includes one or more devices capable of receiving the digital message over a wireless communications link, a communications network comprising one or more communication nodes communicably linked to one or more server computers and a telephone network interface communicably linked to each server computer. Each communication node is capable of establishing the wireless communications link and transmitting the digital message to the one or more devices. The one or more server computers receive the digital message from the source, route the digital message over the communications network to the one or more devices, if any, that are located at the one or more receiving devices, and transmit the digital message to the one or more receiving devices, if any, that do not have the one or more devices using the telephone network interface.

The present invention also provides a system that includes one or more devices capable of receiving the digital message over a wireless communications link, a satellite communications network communicably linked to one or more server computers and a telephone network interface communicably linked to each server computer. The satellite communications network is capable of establishing the wireless communications link and transmitting the digital message to the one or more devices. The one or more server computers receive the digital message from the source, route the digital message over the communications network to the one or more devices, if any, that are located at the one or more receiving devices, and transmit the digital message to the one or more receiving devices, if any, that do not have the one or more devices using the telephone network interface.

BRIEF DESCRIPTION OF THE DRAWINGS

The above and further advantages of the present invention may be better understood by referring to the following description in conjunction with the accompanying drawings, in which:

FIG. 1A illustrates a network topology using six wireless fax nodes having various ranges and being communicably connected to a single wireless fax server in accordance with a preferred embodiment of the present invention;

FIG. 1B illustrates various communication links that can be used to communicably connect the wireless fax nodes to the wireless fax server and wireless fax machines in accordance with a preferred embodiment of the present invention;

FIG. 3A is a block diagram illustrating the major functional components for a wireless fax machine in accordance with a preferred embodiment of the present invention;

FIG. 3B is a block diagram illustrating the major functional components for a wireless fax adapter for use with an existing fax machine in accordance with a preferred embodiment of the present invention;

FIG. 3C is a block diagram illustrating the major functional components for a wireless fax adapter for use with a personal computer in accordance with a preferred embodiment of the present invention.

DETAILED DESCRIPTION OF THE INVENTION

Figure 2A:
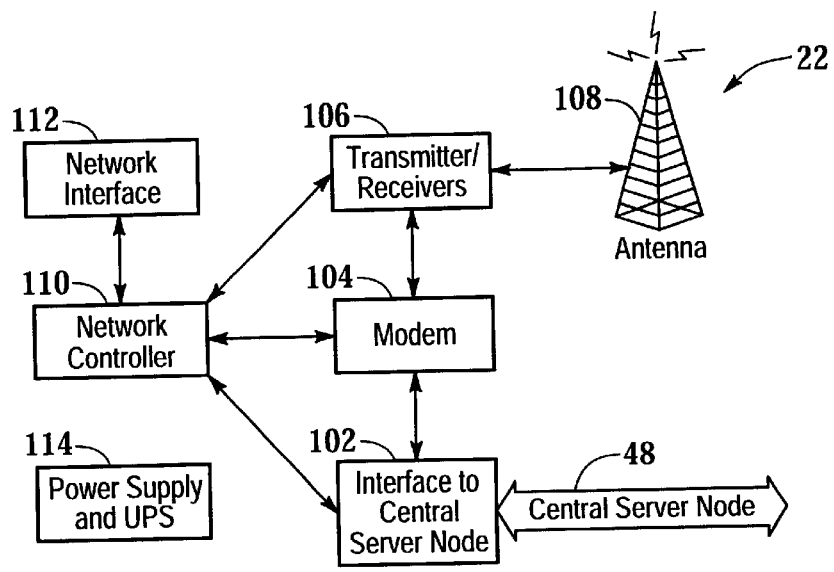
FIG. 2A is a block diagram illustrating the major functional components for a wireless fax node in accordance with a preferred embodiment of the present invention.

The present invention provides a wireless digital message service capable of sending digital messages that are addressed to individual customers as well as specific delivery areas such as zip codes. The use of wireless receiving devices, such as wireless facsimile machine, provides the benefit of allowing the receiving device to be mobile. In addition, a wireless system allows the digital messages to be sent in color, which is highly desirable for businesses wanting to use the system for advertising. Moreover, the service can alternatively send the digital messages over a public switched telephone network ("PSTN") to people and businesses that have regular facsimile machines. And lastly, the service can print, package and address the digital messages for delivery by mail, priority mail or courier service to people and businesses that do not have a facsimile machine.

The present invention uses an addressing system that individually identifies and addresses each customer's wireless facsimile machine. One such addressing system is the Golay Sequential Code, which uses two code words to represent the end users address and has a maximum system capacity of four million users. The selection of codes and formats may depend on a number of factors, such as the number of subscribers to be served, the number of addresses assigned to each subscriber, the expected faxing rate, sectoring arrangement, the data transmission rates possible over the linking network, the propagation factors of the radio frequencies to be used, the type of service (fixed or mobile), the cost of the functionality and the expected error rates. The addressing system is used in one-way systems to allow businesses to direct advertising to certain customers and certify receipt. This allows an advertiser to specify a particular delivery zone, such as by zip code. In a two-way system the addressing system directs the transmission to the proper recipient. Certification of delivery is kept by recording the actual transmission time and destination of the information in a log.

The system capacity of the present invention may depend on the number and characteristics of the radio channels used, the number of times each channel is reused within the system, the actual faxing location requirements of the users, the peak information (address and message) requirements in a location, tolerable faxing delay, data transmission rate, code efficiency, diagnostic routines, error detection/correction, protocols, automatic retry mechanisms, one way and two way networks, modulation scheme and signal to noise ratio ("S/N"). The number of communication nodes that are required for an area will depend on the number of customers and interference factors, such as rain attenuation, foliage and distance attenuation. Additional communication nodes may be added by using lower power levels at each node, re-using frequencies and adding additional cells.

The service provided by the present invention is also scalable. The present invention can be implemented as a single node system and later modified into a multiple node system. The maximum number of nodes is typically driven by the capacity required for the customers served. Moreover existing fax protocols limit the transmission rate because of the extensive time of call setup, e.g., request-to-send and clear-to-send. A better method is to transmit the fax as a data file, i.e. TIF, BITMAP, etc. Using this method, a fax page transmitted at 9600 bps as a data file will take approximately 5 seconds instead of 33 seconds per page. The advantages of sending facsimile messages as data files are higher data throughput, ability to send color faxes, less costly infrastructure, and transmission as synchronous data, which eliminates the need for GPS equipment.

Referring to FIG. 1A, a network topology is illustrated using six wireless fax nodes 22, 24, 26, 28, 30 and 32 in accordance with a preferred embodiment of the present invention. Each of the wireless fax nodes 22, 24, 26, 28, 30 and 32 have various ranges that are illustrated by circles 34, 36, 38, 40, 42 and 44. The physical arrangement of the fax nodes 22, 24, 26, 28, 30 and 32 will vary depending on bandwidth, power ratings, frequency, terrain, the area to be covered and volume. Similarly, the ranges 34, 36, 38, 40, 42 and 44 will vary based on the same factors. The wireless fax nodes 22, 24, 26, 28, 30 and 32 are communicably connected to a single wireless fax server 46 by communication links 48, 50, 52, 54 and 56. These communication links 48, 50, 52, 54 and 56 may be microwave, fiber optic or other reasonable communication methods.

Now referring to FIG. 1B, some of the communication links that may be used to communicably connect the wireless fax nodes to the wireless fax server and wireless fax machines are illustrated in accordance with a preferred embodiment of the present invention. In this example, wireless fax server 46 transmits a facsimile message to wireless fax node receiver/transmitter 22 via a microwave communications link 48. The facsimile message is then transmitted to the destination wireless fax 58 via wireless communication link 60. Alternatively, wireless fax server 46 transmits a facsimile message to wireless fax node receiver/transmitter 26 via a fiber optic cable 56. The facsimile message is then transmitted to the destination wireless fax 62 via wireless communication link 64.

Referring now to FIG. 2A, a block diagram illustrating the major functional components for a wireless fax node is illustrated in accordance with a preferred embodiment of the present invention. Each communication node 22 receives messages from the connection 48 to the server 46 through an interface 102. The communication node 22 also includes a modem 104, a transmitter/receiver 106 and an antenna 108. The transmitter/receiver 106, modem 104 and interface 102 are controlled by a network controller 110 that has a network interface 112. Power is supplied to the node 22 from a power supply 114 and preferably a uninterruptable power supply ("UPS") 114.

Figure 2B:
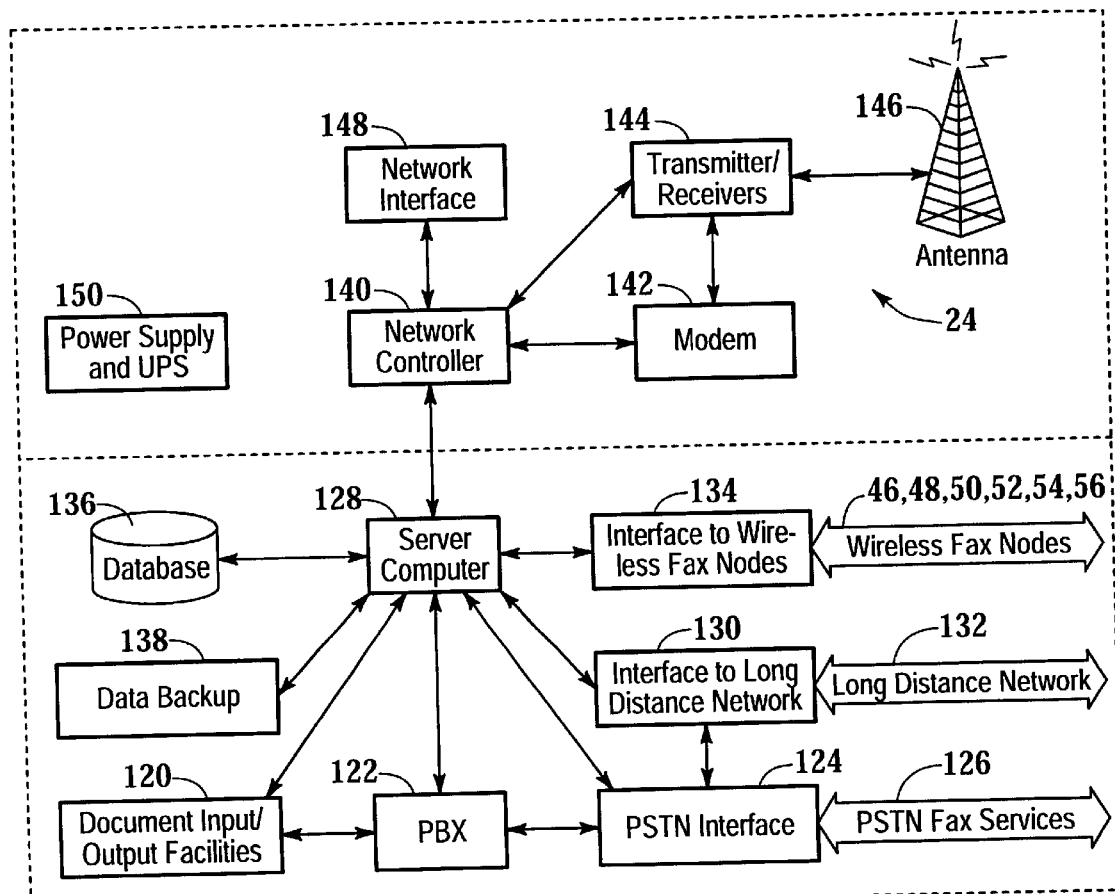
FIG. 2B is a block diagram illustrating the major functional components for a wireless fax node and server in accordance with a preferred embodiment of the present invention.

Referring to FIG. 2B, a block diagram of the major functional components for a wireless fax node and server are illustrated in accordance with a preferred embodiment of the present invention. The server 46 is controlled by a server computer 128 that has a database 136 and data backup system 138. The server computer 128 receives messages from document input/output facilities 120, a telephone private branch exchange ("PBX") 122, a PSTN interface 124 and an interface to long distance network 130. The PSTN interface connects to the PSTN fax services communication link 126 and the long distance network interface 130. The long distance network interface uses communications link 132. The server sends and receives messages to and from the communication nodes through the wireless fax node interface 134 through communication links 48, 50, 52, 54 and 56. The server 46 may be located at the same location as a communication node 24. As previously discussed, the communication node 24 includes a modem 142, a transmitter/receiver 144 and an antenna 146. The transmitter/receiver 144 and modem 142 are controlled by a network controller 140 that has a network interface 148. Power is supplied to the communication node 24 and server 46 from a power supply 150 and preferably a uninterruptable power supply ("UPS") 150.

Referring now to FIG. 3A, a block diagram of the major functional components for a wireless fax machine are illustrated in accordance with a preferred embodiment of the present invention. The wireless fax machine 200 receives transmissions from an external antenna jack 202 or an internal antenna 204. The external antenna jack 202 is useful when the internal antenna 204 is not sufficient to pick up the signals, such as deep within a building. The external antenna jack 202 and internal antenna 204 are connected to a receiver/transmitter unit 206. In some applications, the device 200 may only include a receiver 206. In such a case any outgoing facsimiles would be transmitted over a telephone line 212 via PSTN interface 210. A modem 208 converts the data. The device 200 is controlled by a central processing unit ("CPU") 214 that is connected to a printer 216, scanner 218, the receiver/transmitter 206, modem 208 and telephone interface 210. Power is supplied to the wireless fax machine 200 via power supply 220.

Now referring to FIG. 3B, a block diagram of the major functional components for a wireless fax adapter for use with an existing fax machine are illustrated in accordance with a preferred embodiment of the present invention. The wireless fax adapter 230 receives transmissions from an external antenna jack 232 or an internal antenna 234. The external antenna jack 232 is useful when the internal antenna 234 is not sufficient to pick up the signals, such as deep within a building. The external antenna jack 232 and internal antenna 234 arc connected to a receiver/transmitter unit 236. In some applications, the device 230 may only include a receiver 236. In such a case any outgoing facsimiles would be transmitted over a telephone line 242. A modem 238 converts the data. The wireless fax adapter 230 is controlled by a CPU 244 that is connected to the receiver/transmitter 236, modem 238, telephone interface 240, and fax interface 246. The wireless fax adapter 230 is then connected to an existing facsimile machine 250. Power is supplied to the wireless fax adapter 230 via power supply 248.

Referring to FIG. 3C, a block diagram of the major functional components for a wireless PC adapter for use with a personal computer, such as a laptop or desktop computer, are illustrated in accordance with a preferred embodiment of the present invention. The wireless PC adapter 260 receives transmissions from an external antenna jack 262 or an internal antenna 264. The external antenna jack 262 is useful when the internal antenna 264 is not sufficient to pick up the signals, such as deep within a building. The external antenna jack 262 and internal antenna 264 are connected to a receiver/transmitter unit 266. In some applications, the device 260 may only include a receiver 266. In such a case any outgoing facsimiles would be transmitted by a separate modem (not shown) attached to the personal computer 276. A modem 268 converts the data. The device 260 is controlled by a PC card controller and PC interface 270 that is connected to modem 268, the PC connection 272, and the power supply connection 274. The device 260 is then connected to a personal computer, such as a laptop or desktop computer, 276 through the PC connection 272 and power supply connection 274. Power may be supplied to the wireless PC adapter 260 via the personal computer 276 or an external source (not shown).

Figure 4:
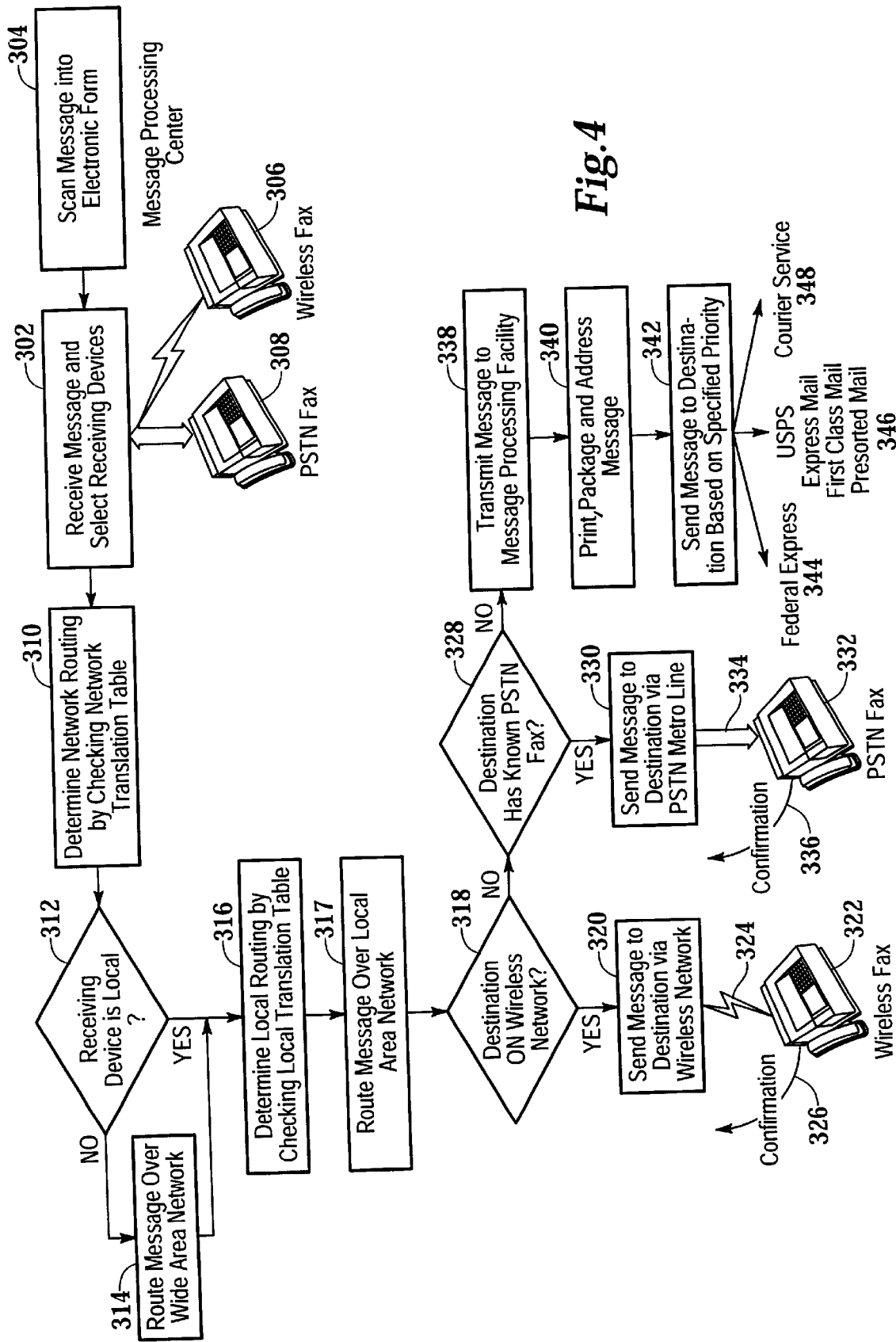
FIG. 4 is a flow chart illustrating the processing steps for delivering a digital message in accordance with a preferred embodiment of the present invention.

Referring to FIG. 4, a flow chart of the processing steps for delivering a digital message is illustrated in accordance with a preferred embodiment of the present invention. An digital message is received in block 302 from a message processing center that scans the message into electronic form in block 304, or a wireless facsimile machine 306, or a facsimile machine 308 connected to a public telephone network. The destination receiving devices are also selected in block 302. After the digital message has been received and the receiving devices have been selected in block 302, the appropriate network routing for the message is determined by checking a network translation table (not shown) in block 310. If the receiving device is not local, as determined in decision block 312, the message is routed to the receiving device over a wide area network in block 314. Once the message reaches the local area network containing the receiving device or if the receiving device was local, as determined in decision block 312, the local routing is determined by checking a local translation table (not shown) in block 316. The digital message is then routed over the local area network in block 317.

If the receiving device is on the wireless network, as determined in decision block 318, the message is transmitted to a wireless facsimile machine 322 at the destination via the wireless network 324 in block 320. Once the message is received, a confirmation is transmitted either by telephone message or wireless message in 326. If, however, the receiving device is not on the wireless network, as determined in decision block 318, and if the receiving device is a known PSTN facsimile machine, as determined in decision block 328, the message is sent to the destination facsimile machine 332 via a PSTN metro line 334 in block 330. Once the message is received, a confirmation is transmitted by telephone message 336.

If, however, the destination does not have a known PSTN facsimile machine, as determined in decision block 328, the message is transmitted to a message processing facility in block 338. At the message processing facility, a hard copy of the message is printed out, packaged and addressed to the destination in block 340. The message is then sent to the destination in block 342 based on the priority specified. As a result, the message may be sent by Federal Express 344, the U.S. Postal Service 346 using Express Mail, first class mail or presorted bulk mail, or a courier service 348.

Although preferred embodiments of the invention have been described in detail, it will be understood by those skilled in the art that various modifications can be made therein without departing from the spirit and scope of the invention as set forth in the appended claims.

What is claimed is:

1. A method for transmitting a digital message from a source to one or more standardly addressable destinations, the method comprising the steps of:

receiving the digital message from the source;

routing the digital message through a local area network until the digital message can be transmitted to each of the one or more standardly addressable destinations;

transmitting the digital message over a wireless communications link to each of the one or more standardly addressable destinations, if any, that has a device for receiving the digital message over the wireless communications link;

transmitting the digital message over a telephone network to each of the one or more standardly addressable destinations, if any, that has a device for receiving the digital message over the telephone network but not over the wireless communications link; and sending a hard copy of the digital message to each of the one or more standardly addressable destinations that do not have devices for receiving the digital message over the wireless communications link or the telephone network.

2. The method for transmitting a digital message from a source to one or more standardly addressable destinations as recited in claim 1, wherein the digital message is a facsimile message.

3. The method for transmitting a digital message from a source to one or more standardly addressable destinations as recited in claim 1, wherein the digital message is a color facsimile message.

4. The method for transmitting a digital message from a source to one or more standardly addressable destinations as recited in claim 1, wherein the digital message is an advertisement.

5. The method for transmitting a digital message from a source to one or more standardly addressable destinations as recited in claim 1, wherein the digital message is a bill.

6. The method for transmitting a digital message from a source to one or more standardly addressable destinations as recited in claim 1, wherein the wireless communication link is a radio frequency broadcast.

7. The method for transmitting a digital message from a source to one or more standardly addressable destinations as recited in claim 1, wherein the wireless communication link is a satellite broadcast.

8. The method for transmitting a digital message from a source to one or more standardly addressable destinations as recited in claim 1, wherein the source is a facsimile machine.

9. The method for transmitting a digital message from a source to one or more standardly addressable destinations as recited in claim 1, wherein the source is a wireless facsimile machine.

10. The method for transmitting a digital message from a source to one or more standardly addressable destinations as recited in claim 1, wherein the source is a scanner.

11. The method for transmitting a digital message from a source to one or more standardly addressable destinations as recited in claim 1, wherein the source is a computer.

12. The method for transmitting a digital message from a source to one or more standardly addressable destinations as recited in claim 1, wherein the standardly addressable destinations comprise one or more wireless facsimile machines.

13. The method for transmitting a digital message from a source to one or more standardly addressable destinations as recited in claim 1, wherein the standardly addressable destinations comprise one or more wireless facsimile adapters, each wireless facsimile adapter connected to a facsimile machine.

14. The method for transmitting a digital message from a source to one or more standardly addressable destinations as recited in claim 1, wherein the standardly addressable destinations comprise one or more wireless computer adapters, each wireless computer adapter connected to a computer.

15. The method for transmitting a digital message from a source to one or more standardly addressable destinations as recited in claim 1, further comprising the step of confirming that the one or more standardly addressable destinations have received the digital message.

16. The method for transmitting a digital message from a source to one or more standardly addressable destinations as recited in claim 1, further comprising the step of selecting the one or more standardly addressable destinations from a list of destinations.

17. A system for transmitting a digital message, the system comprising:

one or more receiving devices capable of directly receiving the digital message over a wireless communications link;

a communications network comprising one or more communication nodes communicably linked to one or more server computers, each communication node having a broadcast range and the capability of establishing a direct wireless communications link with, and transmitting the digital message to, the one or more receiving devices that are located within the broadcast range of that communication node; and the one or more server computers receiving the digital message from a source, selecting the one or more receiving devices from a list of standardly addressable receiving devices, determining a communication route from the one or more server computers to one or more communication nodes that will transmit the digital message to only the selected receiving devices and routing the digital message over the communications network to the one or more communications nodes that will transmit the digital message to only the selected receiving devices.

18. The system for transmitting a digital message as recited in claim 17, further comprising:

one or more devices capable of receiving the digital message over a telephone network;

a telephone network interface communicably linking each server computer to the telephone network; and the one or more server computers routing the digital message to the one or more devices capable of receiving the digital message over the telephone network using the telephone network interface.

19. The system for transmitting a digital message as recited in claim 17, wherein the wireless communications link is a radio frequency transmission.

20. The system for transmitting a digital message as recited in claim 17, wherein the source is a facsimile machine connected to a telephone network.

21. The system for transmitting a digital message as recited in claim 17, wherein the one or more communication nodes are communicably linked to the one or more server computers using microwave communication links.

22. The system for transmitting a digital message as recited in claim 17, wherein the one or more communication nodes are communicably linked to the one or more server computers using fiber optic communication links.

23. The system for transmitting a digital message as recited in claim 17, wherein the source is a wireless facsimile machine.

24. The system for transmitting a digital message as recited in claim 17, wherein the source is a scanner.

25. The system for transmitting a digital message as recited in claim 17, wherein the source is a computer.

26. The system for transmitting a digital message as recited in claim 17, wherein the one or more devices comprise one or more wireless facsimile machines.

27. The system for transmitting a digital message as recited in claim 17, wherein the digital message is transmitted to more than one of the receiving devices that are capable of receiving the digital message over the wireless communications link using a single wireless transmission.

28. The system for transmitting a digital message as recited in claim 17, wherein the one or more receiving devices comprise one or more facsimile machines connected to a telephone network.

29. The system for transmitting a digital message as recited in claim 17, wherein the digital message is a facsimile message.

30. The system for transmitting a digital message as recited in claim 17, wherein the digital message is a color facsimile message.

31. The system for transmitting a digital message as recited in claim 17, wherein the digital message is an advertisement.

32. The system for transmitting a digital message as recited in claim 17, wherein the digital message is a bill.

33. The system for transmitting a digital message as recited in claim 17, wherein the wireless communication link is a satellite broadcast.

34. The system for transmitting a digital message as recited in claim 17, wherein the receiving devices comprise one or more wireless facsimile adapters, each wireless facsimile adapter connected to a facsimile machine.

35. The system for transmitting a digital message as recited in claim 17, wherein the receiving devices comprise one or more wireless computer adapters, each wireless computer adapter connected to a computer.

36. The system for transmitting a digital message as recited in claim 17, wherein the one or more server computers confirm that the one or more selected receiving devices have received the digital message.

37. A system for transmitting a digital message, the system comprising:

one or more devices capable of receiving the digital message over a wireless communications link;

a satellite communications network comprising at least one satellite communicably linked to one or more server computers and capable of establishing the wireless communications link with, and transmitting the digital message to, the one or more devices; and the one or more server computers receiving the digital message from a source, selecting the one or more devices from a list of standardly addressable devices, determining a communication route from the one or more server computers to the satellite that will transmit the digital message to only the selected devices and routing the digital message over the satellite communications network to the satellite that will transmit the digital message to only the selected devices.

38. The system for transmitting a digital message as recited in claim 37, further comprising:

one or more devices capable of receiving the digital message over a telephone network;

a telephone network interface communicably linking each server computer to the telephone network; and the one or more server computers routing the digital message to the one or more devices capable of receiving the digital message over the telephone network using the telephone network interface.

39. The system for transmitting a digital message as recited in claim 37, wherein the digital message is a facsimile message.

40. The system for transmitting a digital message as recited in claim 37, wherein the digital message is a color facsimile message.

41. The system for transmitting a digital message as recited in claim 37, wherein the digital message is an advertisement.

42. The system for transmitting a digital message as recited in claim 37, wherein the digital message is a bill.

43. The system for transmitting a digital message as recited in claim 37, wherein the receiving devices comprise one or more wireless facsimile adapters, each wireless facsimile adapter connected to a facsimile machine.

44. The system for transmitting a digital message as recited in claim 37 wherein the receiving devices comprise one or more wireless computer adapters, each wireless computer adapter connected to a computer.

45. The system for transmitting a digital message as recited in claim 37, wherein the one or more server computers confirm that the one or more selected receiving devices have received the digital message.

* * * * *